Patented Nov. 13, 1934

1,980,273

UNITED STATES PATENT OFFICE 1,980,273

BLEACHING WAXES

Arthur Hough, Passaic, N. J., assignor to Theodor Leonhard Wax Company, Haledon, N. J., a corporation of New Jersey No Drawing. Application June 25, 1930, Serial No. 463,814. Renewed April 16, 1934

8 Claims. (Cl. 87—19)

My invention relates to improved methods of bleaching waxes and more particularly to the bleaching of beeswax.

The object of my invention is to bleach the wax, quickly, and economically, by means of chemicals alone or by means of chemicals and light either natural sunlight or artificial light, such as the light produced by the arc lamp in which an electric current of relatively high density is employed, and using carbons specially prepared to develop the ultra-violet rays combined with other rays characteristic of such carbons.

Waxes have been bleached by many methods before the advent of my invention, but such processes have been only partially satisfactory, and in many processes adopted in the past, the drastic treatment given the waxes to bring about a thorough bleaching have impaired the quality of the wax, and particularly in the case of beeswax, the original characteristics of the substances have been so changed as to render the wax unfit for the preparation of cosmetics for which application a great deal of this wax is employed.

Moreover, in those older processes using potassium permanganate with sulphuric acid, only a part of the available oxygen in the permanganate is actually used, and a great deal of it is wasted by the subsequent reduction of the oxides of manganese by a suitable reducing agent, such as sodium bisulphite or peroxide of hydrogen (the peroxide of hydrogen acting in this case as a reducing agent). Such reducing agents have been necessary for the reason that the oxides of manganese resulting from the action of the potassium permanganate on the organic impurities in the wax, are insoluble or nearly so, in the sulphuric acid of that strength permissible with the wax without injury to its properties or characteristics as required by the United States Pharmacopea.

Sulphuric acid and potassium permanganate have heretofore been used for bleaching some varieties of wax, usually at temperatures between 80° C., and the boiling point (say about 101° C.), this being done in open tanks. In treating waxes that bleach only difficultly, the acid mixture has usually been boiled, which injures the wax somewhat. At such temperatures, and using sulphuric acid, of the low strength permissible as before explained, the resulting oxides of manganese, are practically insoluble in the acid, and therefore require the reducing agent as before mentioned. Again a process operating at atmospheric pressure allows the escape of much of the oxygen developed from the permanganate of potash in molecular form, and the efficiency is very low.

By the use of my invention I avoid all these drawbacks, and the full benefit of the available oxygen contained in the permanganate is obtained forming $K_2SO_4$ and $MnSO_4$, and using the permissible strength of sulphuric acid as outlined and explained above, and rendering unnecessary the employment of any reducing agent, thereby greatly cheapening the process, and obtaining a whiter and better product.

To carry out my invention I proceed as follows:—I melt say 100 pounds of the beeswax preferably with 100 pounds of plain water (the wax having been previously clarified of suspended matter by settling or straining). I then add about five per cent of sulphuric acid (calculated as 100% $H_2SO_4$), and having mixed these well, I add 2% of potassium permanganate as a 5% solution in water. This 5% strength is preferable as the solution keeps better than a stronger solution.

I now place the whole in an autoclave fitted with a stirrer and agitate thoroughly, the stirrer preferably acting downwards. The autoclave is heated up to about 130° C. by means of a steam jacket or other suitable means, the agitator revolving rapidly. When this condition has been maintained for the necessary time (about one hour) it will be found that the manganese oxides have practically all dissolved in the sulphuric acid, and the wax will be found to be well bleached, separating clear at the top of the dilute acid, and may be decanted easily, washed till neutral, and dried ready for commercial uses.

During the reaction going on at the high pressure and temperature, it will be seen that the activity of the weak sulphuric acid is such as to dissolve the oxides of manganese, at the same time the oxygen generated by the potassium permanganate is held in solution for a time and does not rapidly escape as it would at merely atmospheric pressure, and of course the full benefit of the reagent is realized in the bleaching process. Actual tests conducted with an exactly similar quality of wax show that when using this pressure process, only one half the amount of permanganate is required, as compared with the old or atmospheric pressure process, and the time required with the new process is very much less than with the old process.

There are several modifications of the new process possible as far as the actual procedure is concerned, and I wish it to be distinctly understood that I do not confine myself to the details of the above example. For instance under certain circumstances I may raise the temperature of the molten wax, water and acid in the autoclave to the required temperature first, and then inject the permanganate solution under pressure at any desired rate, so as to permit the reaction to proceed more slowly, which is an advantage when bleaching a very low grade of wax containing a large amount of organic impurities, and under such conditions, with such waxes of course a much greater amount of the permanganate is required, and of course a correspondingly greater amount of sulphuric acid to dissolve the oxides of manganese formed. When bleaching such low grade waxes however, it is advisable to employ more water in order to keep the actual concentration of the sulphuric acid low enough to prevent injury to the wax. These matters are operating considerations however, and can be readily determined.

The temperature and pressure in the autoclave need only be such as to reach the critical point at which the dilute sulphuric acid will dissolve the oxides of manganese. This temperature and pressure may be brought about by raising the steam pressure in the autoclave alone, or, in addition to the heating, compressed air may be employed in the autoclave as well, if desired.

I have mentioned sulphuric acid and potassium permanganate for bleaching as this acid is relatively very cheap and is very effective giving the solution of the sulphates of manganese and of potassium, such solution responding readily to the electrolytic action if recovery of the permanganate is required. To this end, all that has to be done is to insert two lead electrodes in the solution and pass a current through the solution, preferably about one quarter of an ampere per square inch of anode area, and the formation of potassium permanganate is very rapid.

Other acids may be used however, such as phosphoric either the meta or the ortho variety (the meta being best and requiring less of it) or the phosphates in solution, acidified with sulphuric acid, when excellent results are obtained. Or nitre cake (NaHSO$_4$) may be employed together with the potassium permanganate, giving good results. In fact a variety of acids may be used with more or less success, for best practical results however, sulphuric and phosphoric acids are the best. Potassium permanganate is herein discussed as being used, this being about the most common permanganate now on the market. Other permanganates could be used equally well, in chemically equivalent amount.

I will now give some specific examples of bleaching waxes using different reagents, with the characteristics of each, and details to be observed when conducting the processes:—

Bleaching a fair grade of Brazilian wax (a grade of beeswax imported from Brazil), using potassium permanganate and sulphuric acid under pressure.

Take 100 parts of the wax and melt same, preferably with a little water, agitate for a few minutes, preferably violently and allow to settle. After standing, to settle, the wax will appear at the top of the water as a clear layer. This should be decanted off, and placed in the autoclave together with about 100 parts of water, and preferably agitated. To this should be added, say, 33 parts of sulphuric acid of 15% strength, or 16.5 parts of the acid at 30% strength. This strength need not be rigidly adhered to, just so long as the resulting mixture is not too dilute. The mixture is now well agitated, and the temperature at this juncture, preferably raised to 130° C., while under a pressure of about 38 lbs., when there should be run into the mixture in the autoclave about 40 parts of a 5% aqueous solution of potassium permanganate. This permanganate solution should be preferably hot, or at least at the temperature above that of the melting point of the wax. The heating should be carried on for about one hour under pressure as in the first example, and the contents of the autoclave examined. Should the purple color of the liquid have disappeared, and the manganese oxides be all dissolved, and yet the wax not thoroughly bleached, the temperature should be again raised, and a little more of the permanganate solution should be injected into the autoclave, continuing the agitation. Generally, this second addition of permanganate will completely bleach the wax to the end point. Then the contents of the autoclave should be removed and allowed to settle for a short time, when the bleached wax will separate to the top and may be decanted and washed up, neutralized, and dried ready for commercial use.

The washing process, whenever permanganates are used for bleaching, should be very carefully performed. For instance during such washing process, tests should be made on the wax to ascertain how free the wax is from manganese in any form it may be present, and just so long as there is any indication of the presence of manganese, the water should be kept just faintly acid. If this is not kept acid, the water and the wax may become alkaline, and such alkalinity is very bad for the reason that the manganese will be fixed in the wax in form of manganese hydroxide, and this is bound to give the wax a poor color. After the complete removal of the manganese, the wax may be further washed to neutrality.

As I have previously remarked, it is not absolutely essential to follow the above directions literally, and the operator should use his judgment to some extent, on any slight modifications of the procedure depending on the grade of wax he may be using at the time.

When using phosphoric acid instead of the sulphuric acid, and particularly if the orthophosphoric is used, the procedure is very similar to the foregoing, only it is advisable to use a little more of this than sulphuric, and the following is a good method:—

100 parts of the beeswax, melted in 100 parts of water, and placed in an autoclave with 20 parts of 70% phosphoric acid. The whole is agitated well as in the previous case, and then the temperature is raised as previously described, to around 130° C. and potassium permanganate solution of preferably 5% strength added as above. The procedure from this point is substantially the same as when using sulphuric acid. If however the meta-phosphoric acid is used much less of this can be employed, and the results of bleaching are just as good.

Phosphoric acid, either the ortho or the meta compound may also be used together with permanganate for bleaching the wax without pressure, and at normal atmospheric pressure, and at such temperatures as have been followed in the past with sulphuric acid and permanganate, and good bleaching results obtained. The efficiency of the reaction is not however so good as when pressure is employed, and the pressure system is to be recommended for this process.

Treatment with light, as above mentioned, can be combined with the chemical treatments given in the above examples.

Beeswax, as has long been known, cannot be treated with strong mineral acids, especially hot, without being decomposed and ruined. Hence, as will be seen in the above examples, the amount of water present is always several times more than the amount of actual mineral acid, and the term "dilute mineral acid" appearing in the claims is intended to be so understood.

I claim:

1. A process of bleaching beeswax which comprises treating the wax with permanganate in the presence of a dilute mineral acid, while hot, and while continuing such treatment until the manganese of the permanganate is converted into a soluble salt.

2. A process of bleaching beeswax which comprises treating the wax with permanganate in the presence of a dilute mineral acid, while hot and under superatmospheric pressure, and while continuing such treatment until the manganese of the permanganate is converted into a soluble salt.

3. A process of bleaching beeswax which comprises treating the wax with permanganate in the presence of a dilute acid selected from the herein described group consisting of sulphuric and phosphoric acids, and acid sulphate, while hot, and while continuing such treatment until the manganese of the permanganate is converted into a soluble salt.

4. A process of bleaching beeswax which comprises treating the wax with permanganate in the presence of dilute sulphuric acid, while hot, and while continuing such treatment until the manganese of the permanganate is converted into a soluble salt.

5. A process of bleaching beeswax which comprises treating the wax with permanganate in the presence of dilute phosphoric acid, while hot, and while continuing such treatment until the manganese of the permanganate is converted into a soluble salt.

6. A process of bleaching beeswax which comprises treating the wax with permanganate in the presence of a dilute mineral acid, while hot and while agitating under superatmospheric pressure, and while continuing such treatment until the manganese of the permanganate is converted into a soluble salt.

7. A process which comprises melting beeswax in the presence of water, adding sulphuric acid equal to a few percent of the water present, adding permanganate solution containing permanganate equal to a few per cent only of the wax, maintaining the mass at a temperature above the normal boiling point, and under superatmospheric pressure, while subjecting same to strong agitation, until the color of the manganese compounds has largely disappeared, then separating the wax from the residual liquor.

8. A process which comprises bleaching beeswax by treatment with water, acid and permanganate, hot and under agitation, until the manganese of the permanganate has been largely converted into salts, thereafter washing the wax with slightly acidulated water, until the manganese is at least largely removed, and thereafter washing out acids from the wax.

ARTHUR HOUGH.